US006824723B2

United States Patent
Kawamura et al.

(10) Patent No.: US 6,824,723 B2
(45) Date of Patent: Nov. 30, 2004

(54) MOLDING AND TENTATIVELY RETAINING MOLD AND METHOD OF MOLDING AND TENTATIVE RETENTION

(75) Inventors: Norio Kawamura, Shizuoka (JP); Hiroshi Murashita, Shizuoka (JP); Junich Hamamoto, Shizuoka (JP); Takashi Masuda, Shizuoka (JP); Toshimi Nakashima, Shizuoka (JP); Kazuhiko Hiraguchi, Shizuoka (JP); Kenji Takahashi, Shizuoka (JP)

(73) Assignee: Yazaki Corporation, Tokyo (JP)

( * ) Notice: Subject to any disclaimer, the term of this patent is extended or adjusted under 35 U.S.C. 154(b) by 29 days.

(21) Appl. No.: 09/739,671

(22) Filed: Dec. 20, 2000

(65) Prior Publication Data

US 2001/0011785 A1 Aug. 9, 2001

(30) Foreign Application Priority Data

Dec. 20, 1999 (JP) ................................ P. HEI. 11-361668

(51) Int. Cl.⁷ .............................................. B29C 45/04
(52) U.S. Cl. ................................ 264/297.2; 264/328.8; 264/297.8; 425/588
(58) Field of Search .......................... 264/297.2, 328.8, 264/297.8; 425/588

(56) References Cited

U.S. PATENT DOCUMENTS

| 5,709,831 A | * | 1/1998 | Endo et al. ................. 264/238 |
| 5,961,910 A | * | 10/1999 | Ito et al. ..................... 264/238 |
| 6,596,211 B2 | * | 7/2003 | Kawamura et al. ......... 264/161 |

FOREIGN PATENT DOCUMENTS

| EP | 0 733 463 | 9/1996 | .......... B29C/69/00 |
| JP | 8-250183 | 9/1996 | .......... H01R/13/42 |

* cited by examiner

*Primary Examiner*—Leo B. Tentoni
*Assistant Examiner*—Monica A. Fontaine
(74) *Attorney, Agent, or Firm*—Sughrue Mion, PLLC (57) ABSTRACT

A molding and tentatively retaining mold 10 of the invention has a plurality of molds which are relatively movable with respect to a fixed mold, and molds a housing 31 and rear holders 32 and 33, which are respectively independent, in a plurality of cavities formed in cooperation with the fixed mold. When the rear holders 32 and 33 are relatively moved with respect to the housing 31 by a pair of rear-holder tentatively retaining cylinders 19 after molding, and are tentatively retained, the amount of movement of a pair of third movable molds 14 is set to be greater by a predetermined amount than an amount of movement necessary for tentatively retaining the rear holders 32 and 33, and the third movable molds 14 after movement are stopped at the moved positions until a predetermined time elapses.

3 Claims, 10 Drawing Sheets

MOLDING AND TENTATIVELY RETAINING MOLD AND METHOD OF MOLDING AND TENTATIVE RETENTION

BACKGROUND OF THE INVENTION

1. Field of the Invention

The present invention relates to a molding and tentatively retaining mold and a method of molding and tentative retention in which a plurality of kinds of independent parts of different shapes are molded in a plurality of cavities formed between a fixed mold and a plurality of movable molds, and at least one part after molding is relatively moved with respect to another part by the movable mold so as to set the parts in a tentatively retained state.

The present application is based on Japanese Patent Application No. Hei. 11-361668, which is incorporated herein by reference.

2. Description of the Related Art

Conventional molding and tentatively retaining molds for effecting the molding and tentative retention of a connector with rear holders are disclosed in JP-A-8-250183 and the like.

Figure 11:
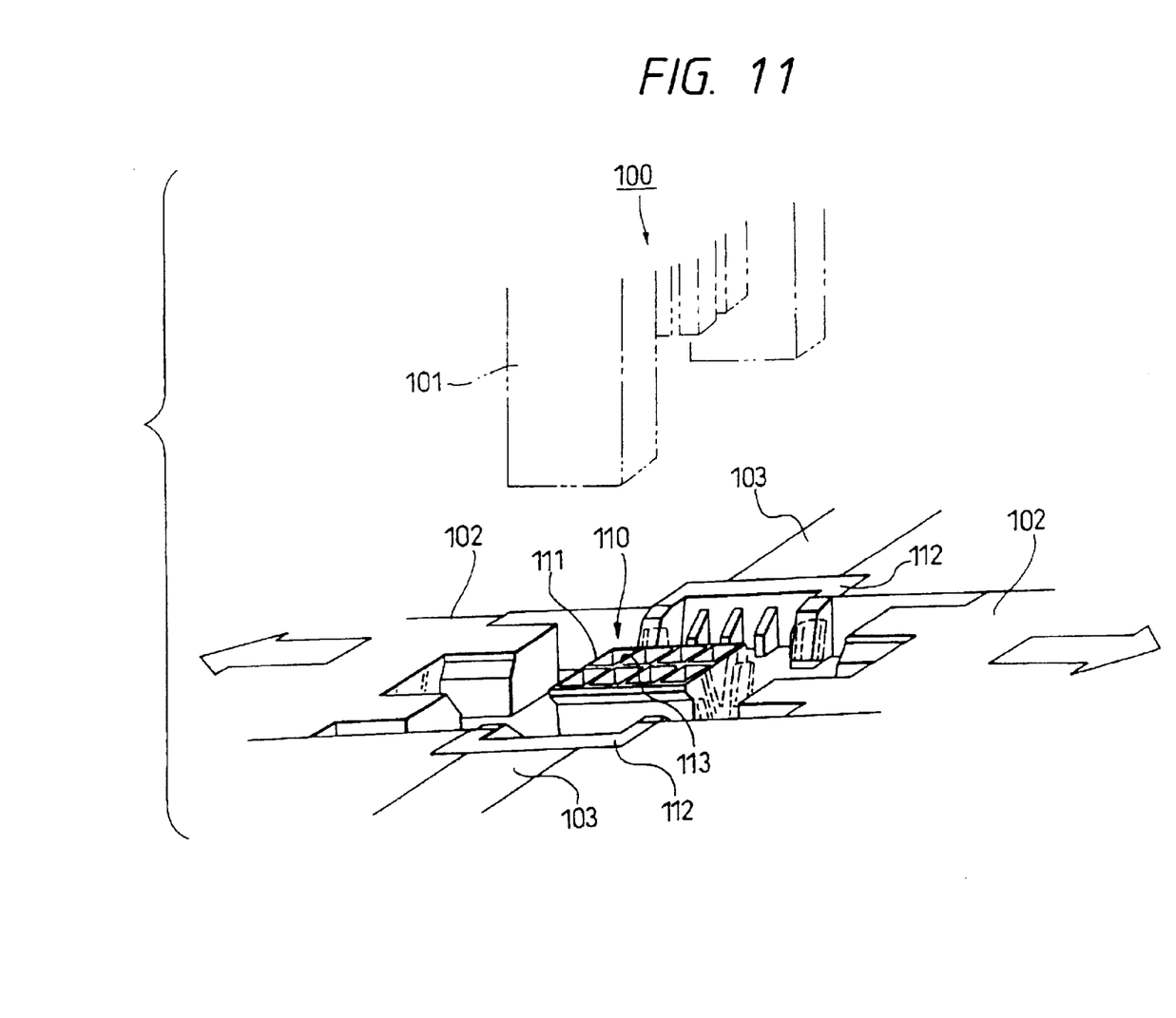
FIG. 11 is a schematic perspective view illustrating a conventional molding and tentatively retaining mold.

As shown in FIG. 11, a conventional molding and tentatively retaining mold 100 is comprised of an unillustrated fixed mold, a first movable mold 101 which is movable in vertical directions in the drawing, a pair of second movable molds 102 which are movable in left- and rightward directions in the drawing, and a pair of third movable molds 103 which are movable in a direction perpendicular to the second movable molds 102. It should be noted that a connector 110 with rear holders is comprised of a housing 111 having a plurality of terminal accommodating chambers 113 and a pair of rear holders 112 which are respectively retained on both sides of the housing 111.

In addition, inner surfaces of the first and second movable molds 101 and 102 form a cavity for molding the housing 111 of the connector 110 with rear holders in cooperation with the fixed mold. In addition, outer surfaces of the first movable mold 101, inner surfaces of the second movable molds 102, and inner surfaces of the third movable molds 103 form cavities for molding the respective rear holders 112 of the connector 110 with rear holders in cooperation with the fixed mold.

In the above-described molding and tentatively retaining mold 100, when the molding and tentative retention of the connector 110 with rear holders is effected, a resin material is charged into the respective cavities, for instance, from the upper direction in the drawing through unillustrated runners for the respective cavities in a state in which the fixed mold and the movable molds 101, 102, and 103 are joined together. Consequently, the housing 111 and the rear holders 112 of the connector 110 with rear holders are molded independently, respectively.

Next, the first movable mold 101 is moved upwardly in the drawing, and the second movable molds 102 are respectively moved in the directions of arrows in the drawing. Consequently, predetermined gaps are respectively produced between the respective rear holders 112 and the housing 111. In this state, the third movable molds 103 are respectively moved toward the housing 111 so as to tentatively retain the rear holders 112 onto the side surfaces of the housing 111.

Then, after the housing 111 and the rear holders 112 are tentatively retained, the third movable molds 103 are returned to their original positions by urging forces of unillustrated springs. This series of operation including the movement of the third movable molds 103 toward the housing 111 and the movement thereof in directions away from the housing 111 after the tentative retention of the rear holders 112 is effected continuously almost without stopping.

Subsequently, the connector 110 with rear holders in a tentatively retained state is released from the mold, and is transferred to an ensuing process of insertion of connecting terminals.

With the above-described conventional molding and tentatively retaining mold 100, when the rear holders 112 are relatively moved with respect to the housing 111 by the third movable molds 103 and are tentatively retained, after the third movable molds 103 are moved by an amount necessary for tentative retention of the rear holders 112, the operation of returning the third movable molds 103 to their original positions is effected by the urging forces of the springs.

However, there has been a problem in that the rear holders 112 tentatively retained onto the housing 111 become dislocated from the housing 111 in conjunction with the returning operation of the third movable molds 103 owing to the softness and the like of the rear holders 112 immediately after molding.

SUMMARY OF THE INVENTION

The object of the invention is to provide a molding and tentatively retaining mold and a method of molding and tentative retention which make it possible to relatively move and reliably retain at least one part with respect to another part by movable molds after molding and to prevent the trouble of such as the cancellation of tentative retention of the parts.

The above object can be attained by a molding and tentatively retaining mold comprising a plurality of movable molds provided in such a manner as to be relatively movable with respect to said fixed mold and adapted to respectively mold a plurality of kinds of independent parts of different shapes in a plurality of cavities formed in cooperation with said fixed mold, and to relatively move at least one part with respect to another part after molding so as to set said parts in a tentatively retained state; and a plurality of runners respectively provided for the cavities to charge a molding material into the cavities, wherein an amount of movement of said movable mold at a time when said at least one part is relatively moved with respect to said other part and is tentatively retained after molding is set to be greater by a predetermined amount of movement than an amount of movement necessary for tentatively retaining said at least one part to said other part, and said movable mold after movement is stopped at a moved position until a predetermined time elapses.

In the molding and tentatively retaining mold constructed as described above in accordance with the invention, a molding material is charged into a plurality of cavities formed between the fixed mold and the movable molds through runners. Consequently, a plurality of kinds of independent parts of different shapes is respectively molded in the cavities.

After the molding of the respective parts, the movable mold moves so as to cause at least one part to relatively move with respect to another part. Namely, as the movable mold moves towards the other part, one part interposed therebetween is retained onto the other part in a tentatively retained state. At this juncture, the amount of movement of the movable mold is set to be greater by a predetermined amount than an amount of movement necessary for moving the one part. Namely, the movable mold moves toward the other part additionally by a very small length more than an amount of movement necessary for tentative retention of the one part, and the movable mold is so set as to stop at the moved position until a predetermined time elapses. Consequently, the at least one part moved by the movable mold is tentatively retained reliably onto the other part without coming off.

In addition, the above object can be attained by a method of molding and tentatively retaining comprising, molding a plurality of kinds of independent parts of different shapes in a plurality of cavities formed between a fixed mold and a plurality of movable molds provided in such a manner as to be relatively movable with respect to said fixed mold by charging a molding material into said cavities through runners respectively provided for said cavities, and at least one part is relatively moved with respect to another part after molding so as to set said parts in a tentatively retained state, wherein, an amount of movement of said movable mold at a time when said at least one part is relatively moved with respect to said other part by said movable mold and is tentatively retained after molding is set to be greater by a predetermined amount of movement than an amount of movement necessary for tentatively retaining said at least one part to said other part, and said movable mold after movement is stopped at a moved position until a predetermined time elapses.

In the method of molding and tentatively retaining arranged as described above in accordance with the invention, a molding material is charged into a plurality of cavities formed between a fixed mold and a plurality of movable molds provided in such a manner as to be relatively movable with respect to the fixed mold, through runners respectively provided for the cavities. Consequently, a plurality of kinds of independent parts of different shapes are respectively molded in the cavities.

Next, at least one part is relatively moved with respect to another part after molding. Namely, as the movable mold moves towards the other part, one part interposed therebetween is retained onto the other part in a tentatively retained state.

At this juncture, the amount of movement of the movable mold is set to be greater by a predetermined amount than an amount of movement necessary for retaining the one part to the other part. Namely, the movable mold moves toward the other part additionally by a very small length more than the amount of movement necessary for tentative retention of the one part, and the movable mold is so set as to stop at the moved position until a predetermined time elapses. Consequently, the at least one part moved by the movable mold is tentatively retained reliably onto the other part without coming off.

DETAILED DESCRIPTION OF THE PREFERRED EMBODIMENTS

Figure 1:
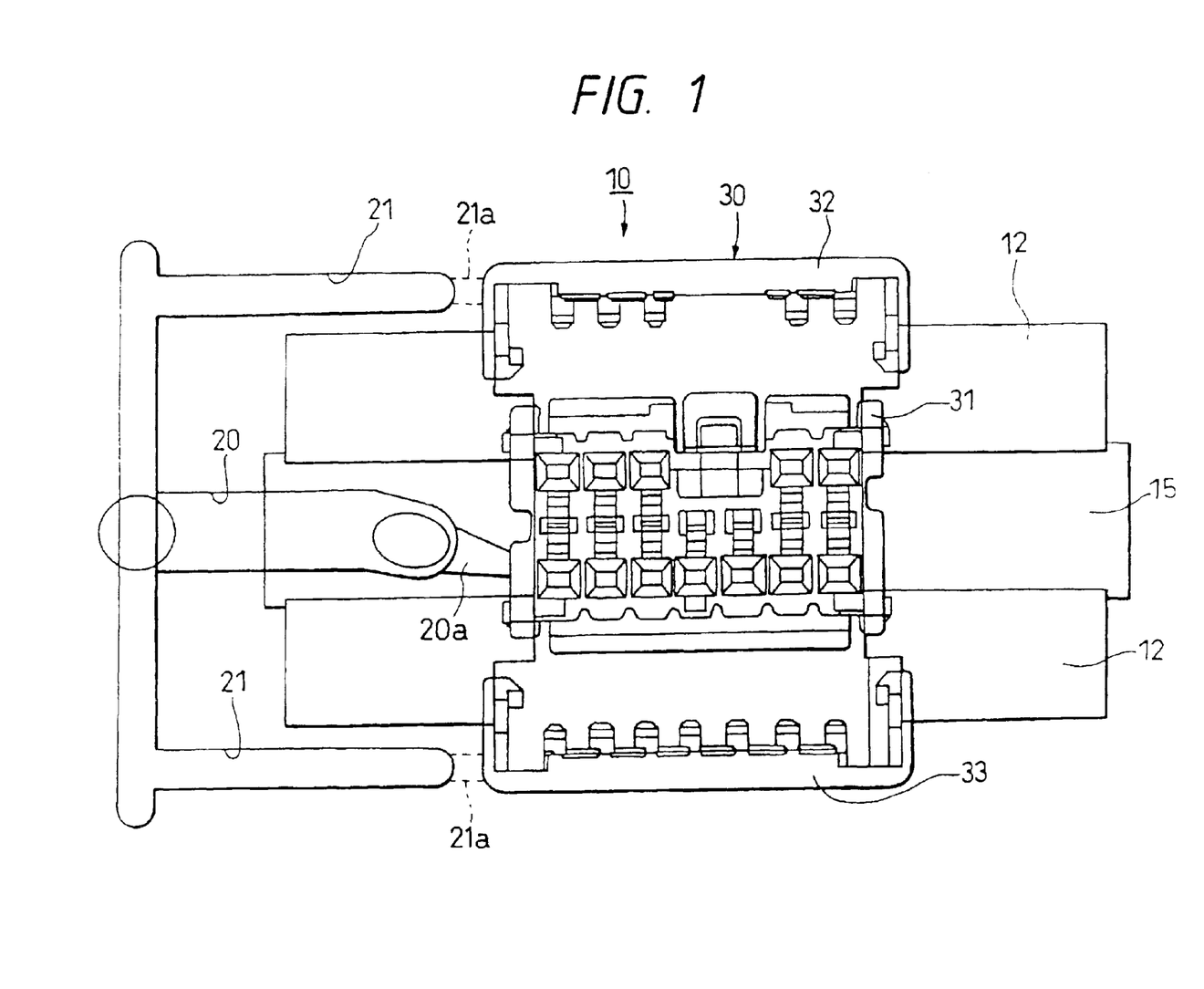
FIG. 1 is a schematic plan view illustrating runners for cavities of a molding and tentatively retaining mold and a connector with rear holders in accordance with an embodiment of the invention.
Figure 2A:
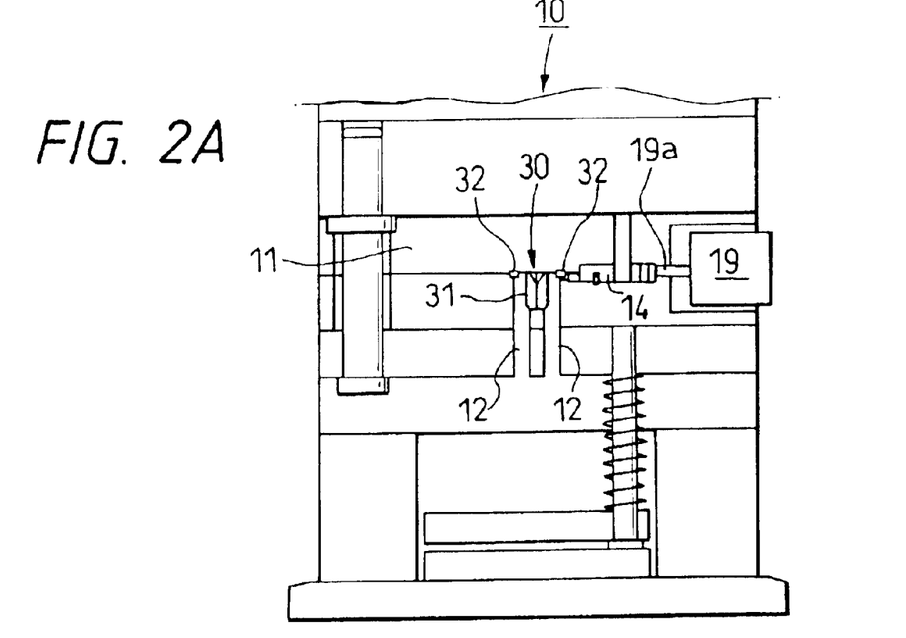
FIG. 2A and FIG. 2B are schematic cross-sectional views of the molding and tentatively retaining mold shown in FIG. 1.
Figure 2B:
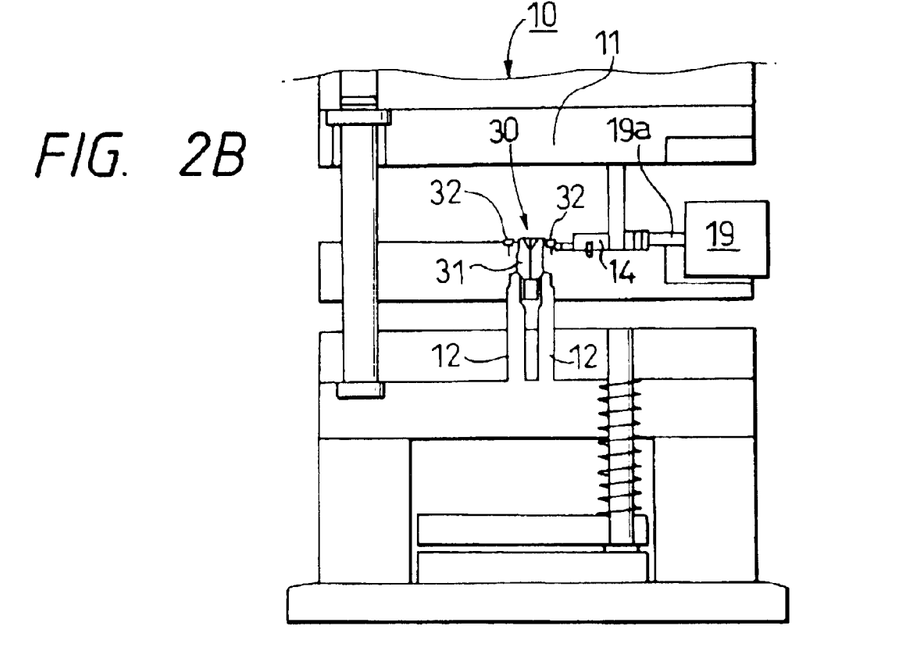
Figure 3:
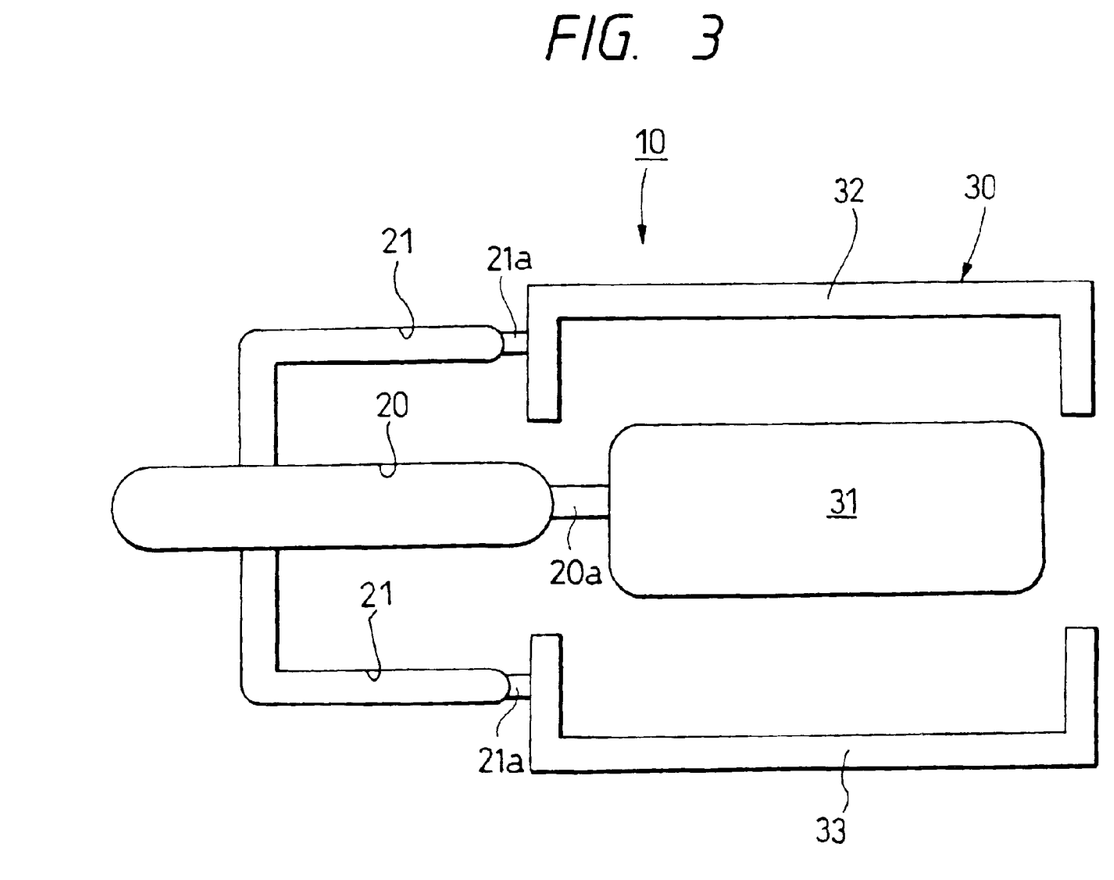
FIG. 3 is a schematic diagram in FIG. 1.

Referring now to FIGS. 1 to 10, a detailed description will be given of a molding and tentatively retaining mold and a method of molding and tentative retention in accordance with the invention. FIG. 1 is a schematic plan view illustrating runners for cavities and a connector with rear holders and showing the embodiment of the molding and tentatively retaining mold in accordance with the invention. FIG. 2A is a schematic cross-sectional view illustrating a state during molding by the molding and tentatively retaining mold in FIG. 1. FIG. 2B is a schematic cross-sectional view illustrating a state during tentative retention by the molding and tentatively retaining mold in FIG. 1. FIG. 3 is a schematic diagram in FIG. 1.

Figure 4:
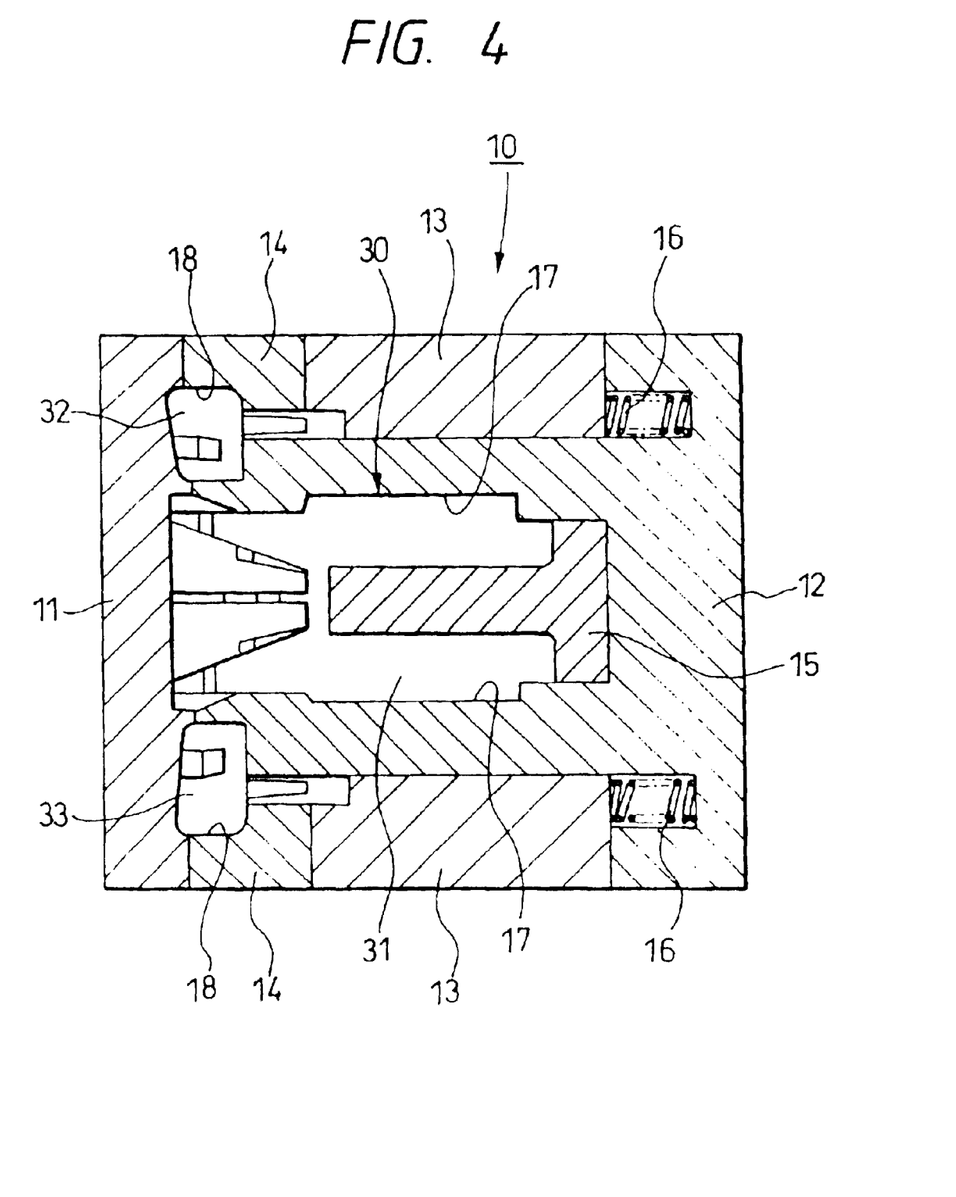
FIG. 4 is a schematic cross-sectional view illustrating a state during molding by the molding and tentatively retaining mold.
Figure 5:
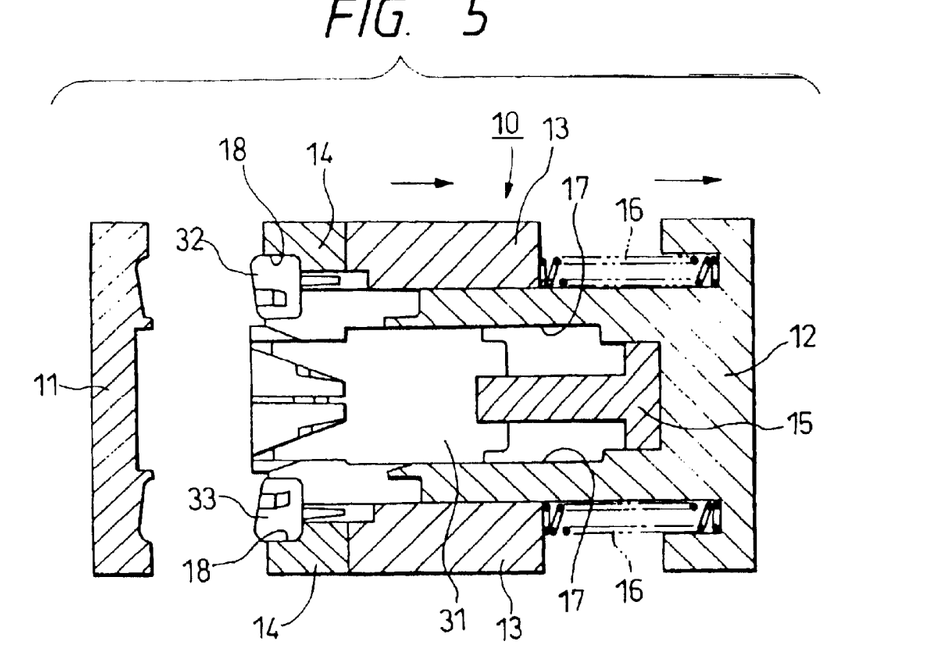
FIG. 5 is a schematic cross-sectional view illustrating a state prior to tentative retention after molding by the molding and tentatively retaining mold.
Figure 6:
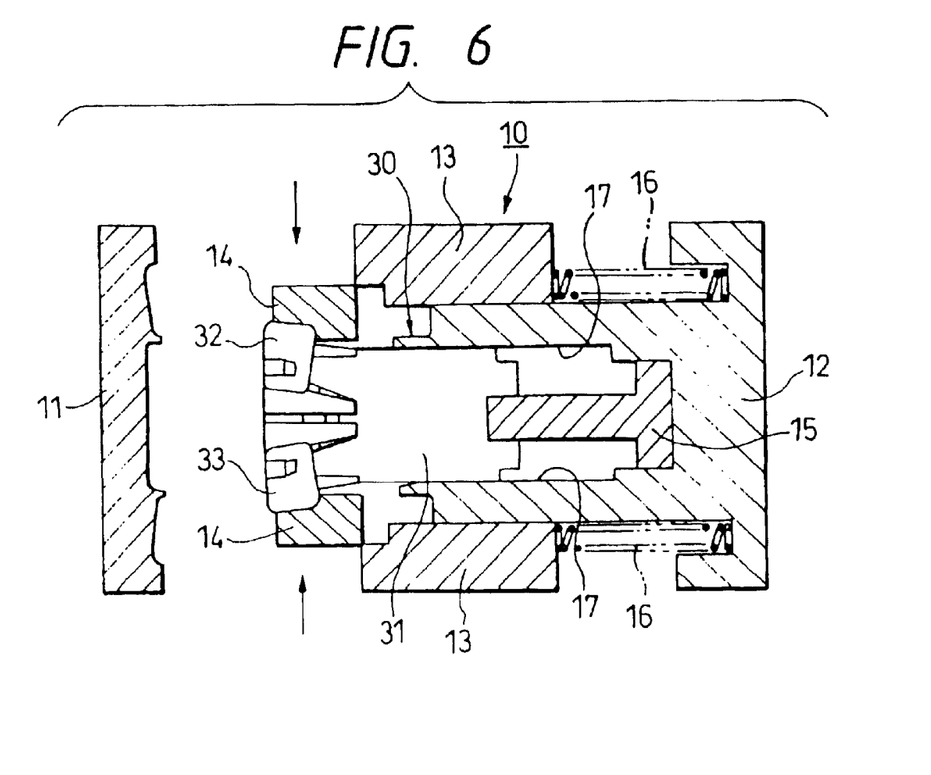
FIG. 6 is a schematic cross-sectional view illustrating a state during tentative retention by the molding and tentatively retaining mold.
Figure 7:
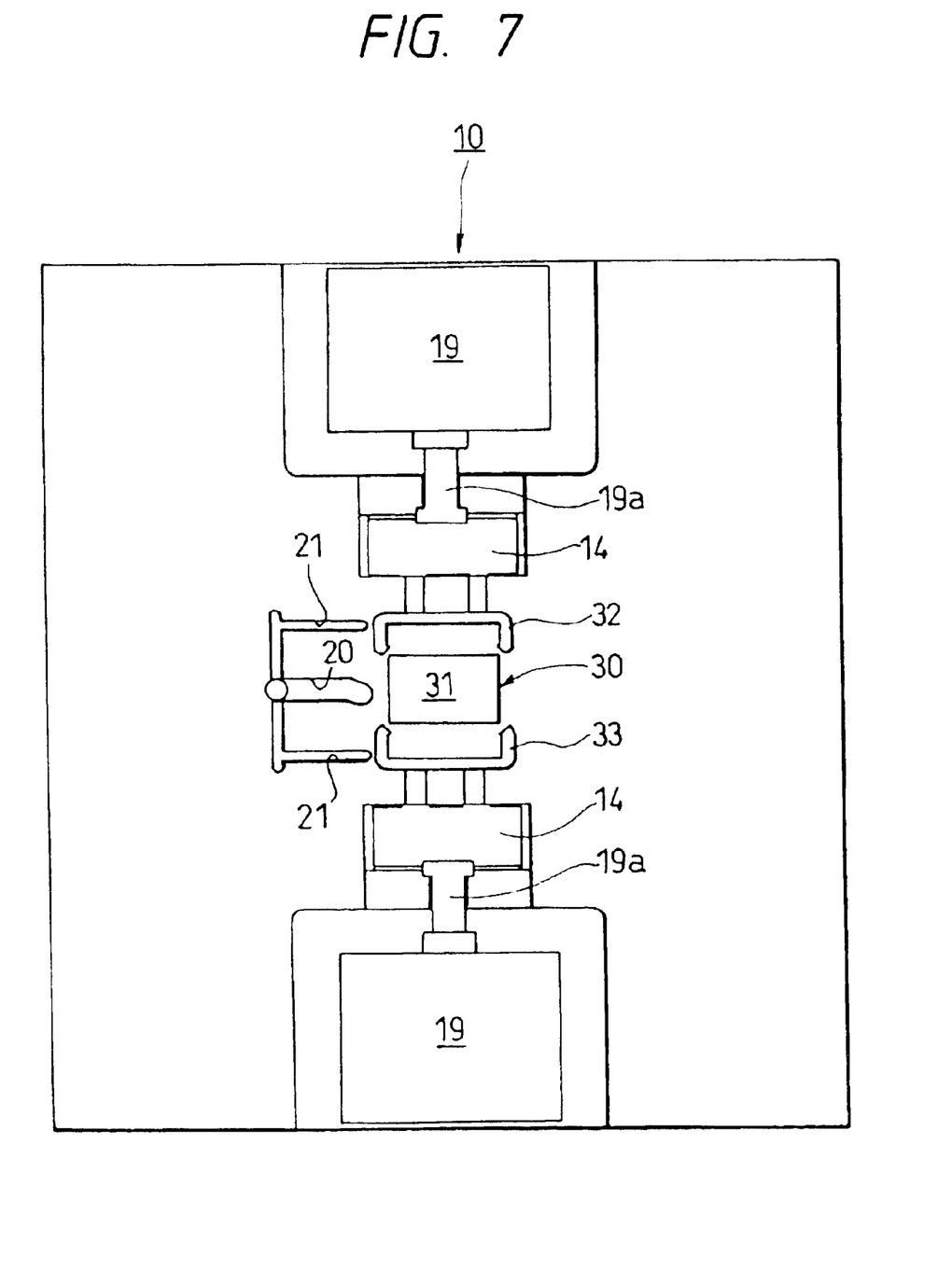
FIG. 7 is a schematic plan view illustrating a state prior to tentative retention by a pair of rear-holder tentatively retaining cylinders of the molding and tentatively retaining mold.
Figure 8:
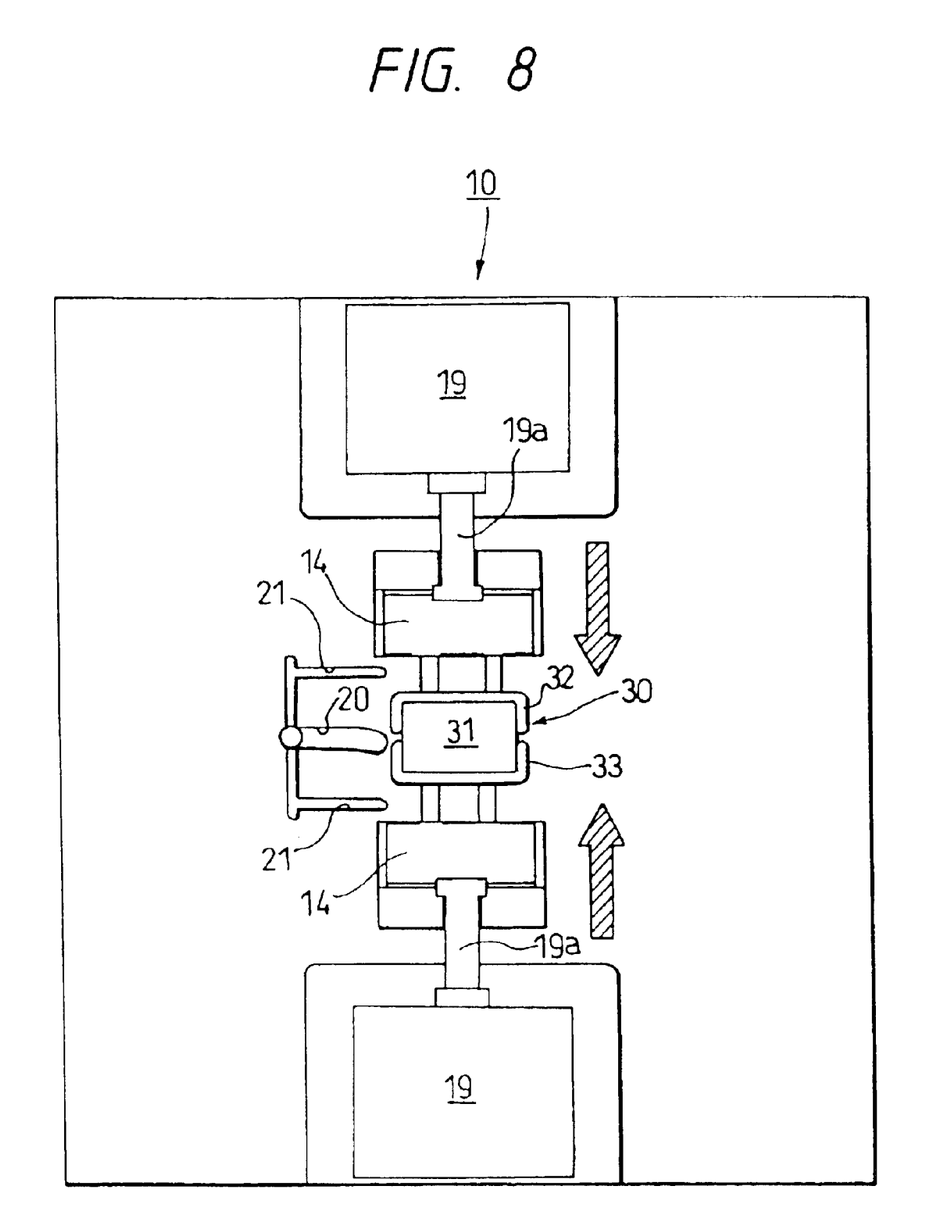
FIG. 8 is a schematic plan view illustrating a state after the tentative retention by the rear-holder tentatively retaining cylinders of the molding and tentatively retaining mold.
Figure 9:
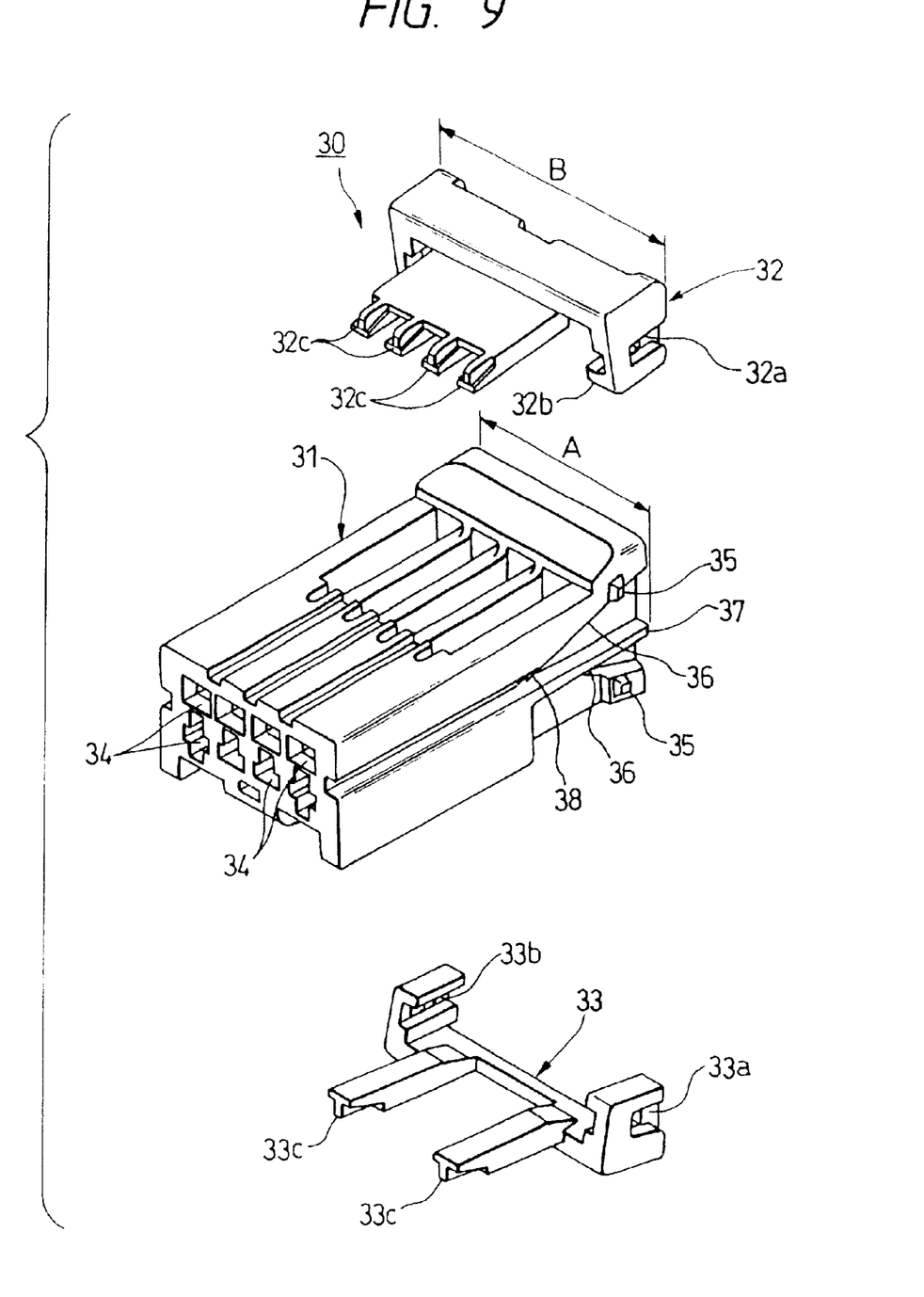
FIG. 9 is an exploded perspective view illustrating a connector with rear holders.
Figure 10:
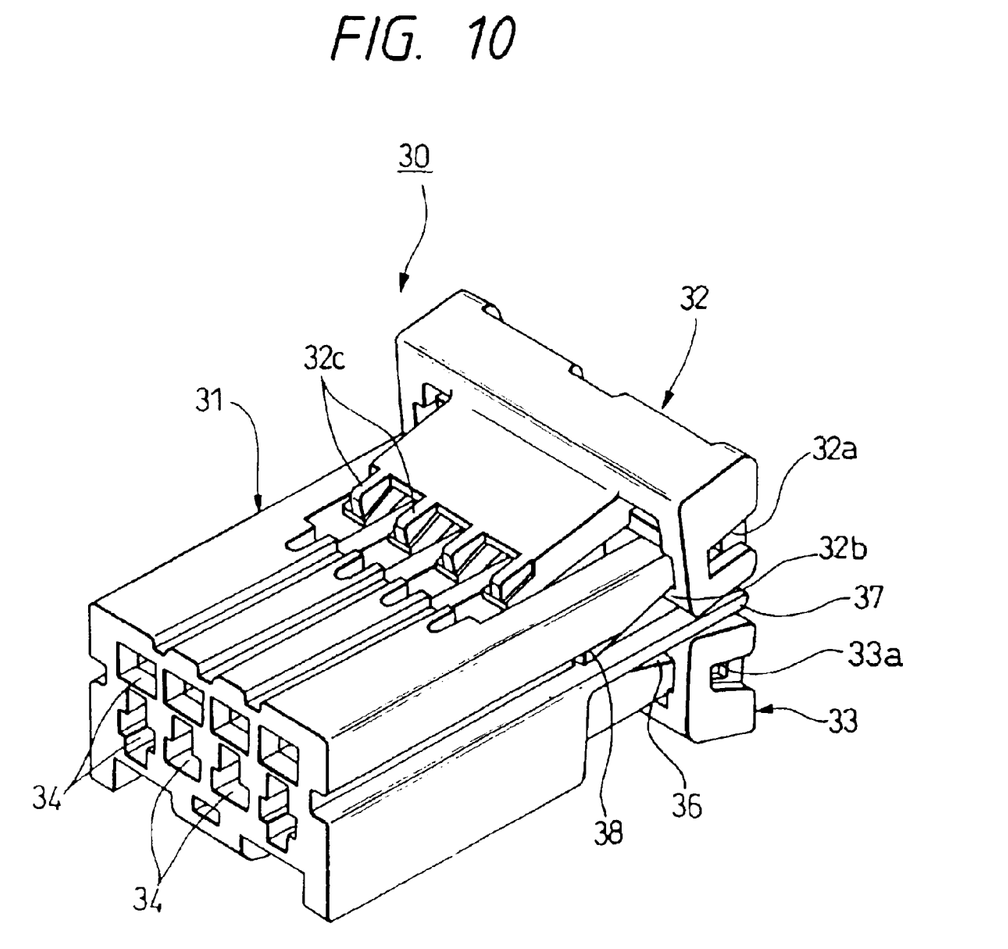
FIG. 10 is a perspective view illustrating a state of tentative retention of the connector with rear holders in FIG. 9.

In addition, FIG. 4 is a schematic cross-sectional view illustrating a state during molding by the molding and tentatively retaining mold. FIG. 5 is a schematic cross-sectional view illustrating a state prior to tentative retention after molding by the molding and tentatively retaining mold. FIG. 6 is a schematic cross-sectional view illustrating a state during tentative retention by the molding and tentatively retaining mold. FIG. 7 is a schematic plan view illustrating a state prior to tentative retention by a pair of rear-holder tentatively retaining cylinders of the molding and tentatively retaining mold. FIG. 8 is a schematic plan view illustrating a state after the tentative retention by the rear-holder tentatively retaining cylinders of the molding and tentatively retaining mold. FIG. 9 is an exploded perspective view illustrating a connector with rear holders. FIG. 10 is a perspective view illustrating a state of tentative retention of the connector with rear holders in FIG. 9.

First, a description will be given of the construction of the molding and tentatively retaining mold in accordance with this embodiment.

As shown in FIG. 4, a molding and tentatively retaining mold 10 is comprised of a fixed mold 11 and first to fourth movable molds 12, 13, 14, and 15, and compression springs 16 are interposed between the first movable mold 12 and the second movable molds 13, respectively. These compression springs 16 constantly urge the first and second movable molds 12 and 13 in directions in which they move away from each other (in the left- and rightward directions in the drawing).

The movable molds 12, 13, 14, and 15 are respectively provided in such a manner as to be relatively movable with respect to the fixed mold 11, and mold a housing 31 and rear holders 32 and 33 of a connector 30 with rear holders independently within a plurality of cavities 17 and 18 formed in cooperation with the fixed mold 11. As the rear holders 32 and 33 after molding are relatively moved with respect to the housing 31, the rear holders 32 and 33 are retained onto the housing 31 in a tentatively retained state.

In addition, inner surfaces of the first movable mold 12 and outer surfaces of the fourth movable mold 15 respectively form the cavity 17 for molding the housing 31 of the connector 30 with rear holders 30 in cooperation with inner surfaces of the fixed mold 11. Further, outer surfaces of the first movable mold 12 and inner surfaces of the third movable molds 14 respectively form the cavities 18 for molding the rear holders 32 and 33 of the connector 30 with rear holders in cooperation with the fixed mold 11. Furthermore, the second movable molds 13 support the first movable mold 12 movably along the left- and rightward directions in the drawing, and support the third movable molds 14 movably along the vertical direction in the drawing.

In addition, as a pair of cylinder rods 19a project in conjunction with the actuation of a pair of rear-holder tentatively retaining cylinders 19 (see FIG. 7), the third movable molds 14 are moved toward the housing 31 side along the vertical directions in the drawing so as to retain the rear holders 32 and 33 onto the housing 31 in a tentatively retained state.

At this juncture, the amount of movement of the third movable molds 14 is set so as to overstroke toward the housing 31 additionally by a very small length (e.g., 0.1 to 0.3 mm or thereabouts) in addition to the amount of movement necessary for tentative retention of the rear holders 32 and 33.

In addition, in the state in which the third movable molds 14 keep the rear holders 32 and 33 pressed against the housing 31 at the aforementioned overstroke, the third movable molds 14 are held at a standstill by the rear-holder tentatively retaining cylinders 19 until a predetermined time (e.g., 2 seconds or thereabouts) elapses. This predetermined time is determined by the resin material, the thickness of the moldings, and the like, and is the time required for the moldings 31, 32, and 33 to sufficiently solidify and for allowing their resiliency to become stabilized.

It should be noted that although the driving of the cylinder rods 19a is effected by air cylinders, the cylinder rods 19a may be alternatively driven by servo motors, cam mechanisms, or the like.

Further, the fourth movable mold 15 is supported by the first movable mold 12, is movable in the left- and rightward directions in the drawing in interlocking relation to the first movable mold 12, and holds the housing 31 during the tentative retention of the rear holders 32 and 33.

Next, a description will be given of runners which serve as channels for the resin material to be charged in the cavities of the mold.

The fixed mold 11 and the movable molds 12, 13, 14, and 15 shown in FIG. 4 are provided with runners 20 and 21 serving as channels for the resin material to be charged for the respective cavities 17 and 18, as shown in FIG. 1. The runners 20 and 21 have channel diameters which are set for the respective cavities 17 and 18 so as to obtain a molding balance in the cavities 17 and 18.

Namely, the ratio of the diameter between the runners 20 and 21 is set to a value whereby the charging of the resin material into the cavities 17 and 18 is completed substantially at the same time. For example, the diameter of the runner 20 in the cavity 17 for the housing 31 is set to about 4-fold in an area ratio with respect to the diameter of the runner 21 for the cavity 18 in each of the rear holders 32 and 33.

Next, a description will be given of the construction of the connector with rear holders.

As shown in FIGS. 9 and 10, the connector 30 with rear holders which is molded in this embodiment includes the housing 31 having a plurality of terminal accommodating chambers 34, as well as the pair of rear holders 32 and 33 which are retained on the upper and lower side surfaces, as viewed in the drawing, of the housing 31. Connecting terminals (not shown) attached to wire terminals are respectively inserted into the terminal accommodating chambers 34 of the housing 31.

In addition, both side surfaces of the housing 31 are respectively provided with a pair of tentatively retaining projections 35 having tapered surfaces, a pair of retaining steps 36 formed in a tapered manner, a protecting rib 37, and a finally retaining projection 38.

In addition, as the tentatively retaining projection 35 on the upper side in FIG. 9 is fitted in a retaining hole 32a provided in the rear holder 32 on the upper side in the drawing (hereafter, referred to as the upper rear holder 32), the upper tentatively retaining projection 35 tentatively retains the upper rear holder 32 onto the housing 31. Meanwhile, as the tentatively retaining projection 35 on the lower side in FIG. 9 is fitted in a retaining hole 33a provided in the rear holder 33 on the lower side in the drawing (hereafter, referred to as the lower rear holder 33), the lower tentatively retaining projection 35 tentatively retains the lower rear holder 33 onto the housing 31.

Further, when the upper rear holder 32 is tentatively retained onto the housing 31 inside the molding and tentatively retaining mold 10, the retaining step 36 on the upper side in FIG. 9 is engaged with a retaining pawl 32b provided on the upper rear holder 32. Meanwhile, when the lower rear holder 33 is tentatively retained onto the housing 31 inside the molding and tentatively retaining mold 10, the retaining step 36 on the lower side in FIG. 9 is engaged with a retaining pawl 33b provided on the lower rear holder 33.

Further, the interval A between the protecting ribs 37 on both left and right sides surfaces, as viewed in the drawing, of the housing 31 is set to be greater than the transverse width B of each of the rear holders 32 and 33, so as to prevent the coming off and the like of the rear holders 32 and 33 from the housing 31 due to an impact from the outside at the time of releasing of the connector 30 with rear holders in the tentatively retained state from the mold.

Further, when the connecting terminals inserted in the connector 30 with rear holders set in the tentatively retained state and released from the mold are primarily retained by housing lances (not shown) in the terminal accommodating chambers 34 in the housing 31, the finally retaining projections 38 are fitted in the retaining holes 32a and 33a of the rear holders 32 and 33, so as to finally retain the rear holders 32 and 33 onto the housing 31. In this state, as secondarily retaining projections 32c and 33c provided on the respective rear holders 32 and 33 are advanced into the terminal accommodating chambers 34 of the housing 31, the connecting terminals are secondarily retained.

Next, a description will be given of the operation of the molding and tentatively retaining mold in this embodiment.

As shown in FIGS. 1 to 4, in the molding and tentatively retaining mold 10 in this embodiment, the resin material is charged into the cavities 17 and 18 for molding the housing 31 and the rear holders 32 and 33 of the connector 30 with rear holders through the corresponding runners 20 and 21 in the state in which the fixed mold 11 and the movable molds 12, 13, 14, and 15 are joined together, as described above.

Namely, the resin material is charged into the cavity 17 for the housing 31 from the runner 20 through a tunnel gate 20a, while the resin material is charged into the cavities 18 for the rear holders 32 and 33 from the runners 21 through tunnel gates 21a. Consequently, the housing 31 and the rear holders 32 and 33 are independently molded inside the cavities 17 and 18, respectively.

Subsequently, as the cylinder rods 19a project in conjunction with the actuation of the rear-holder tentatively retaining cylinders 19, the third movable molds 14 are moved toward the housing 31 along the vertical directions in FIG. 4, thereby moving the rear holders 32 and 33 toward the housing 31.

At this juncture, the third movable molds 14 are moved by the rear-holder tentatively retaining cylinders 19 toward the housing 31 additionally by a very small length for pressing the rear holders against the housing 31 in addition to the predetermined amount of movement necessary for tentative retention of the rear holders 32 and 33. Further, the third movable molds 14 are held at a standstill until a predetermined time elapses in the state in which they keep the rear holders 32 and 33 after moving pressed against the housing 31.

As a result, the third movable molds 14 tentatively retain the rear holders 32 and 33 onto the housing 31 reliably without coming off, and retain the connector 30 with rear holders in the tentatively retained state.

Next, referring to FIGS. 4 to 8, a description will be given of a method of molding and tentatively retaining a connector with rear holders by using the molding and tentatively retaining mold in accordance with this embodiment.

First, as shown in FIG. 4, in the state in which the fixed mold 11 and the movable molds 12, 13, 14, and 15 are joined together, the resin material is charged into the cavities 17 and 18 formed in the mold through the corresponding runners 20 and 21 (see FIG. 7). As a result, the housing 31 and the rear holders 32 and 33 are respectively molded independently in the cavities 17 and 18.

At this juncture, since the channel diameters of the runners 20 and 21 are set in correspondence with the volumes of the moldings for the respective cavities 17 and 18, the charging of the resin material into the respective cavities 17 and 18 can be completed substantially at the same time.

Next, as shown in FIG. 5, the movable molds 12, 13, 14, and 15 are moved from the fixed mold 11 by predetermined amounts in the rightward direction in the drawing, and the first movable mold 12 is moved by a predetermined amount in the rightward direction in the drawing with respect to the second movable molds 13 by the urging forces of the compression springs 16.

At this juncture, the fourth movable mold 15 is moved by a predetermined amount with respect to the second movable molds 13 in interlocking relation to the first movable mold 12 up to a position for forming cavities in the molded housing 31 by a left end portion, as viewed in the drawing, of the fourth movable mold 15. Further, predetermined gap are formed on the inner sides of the third movable molds 14 by the movement of the first movable mold 12.

Next, as shown in FIGS. 6 to 8, the respective third movable molds 14 are moved by the rear-holder tentatively retaining cylinders 19 toward the housing 31 in the directions of arrows in the drawing by very small lengths for pressing the rear holders 32 and 33 against the housing 31 in addition to the amounts of movement necessary for tentative retention of the rear holders 32 and 33. Then, the third movable molds 14 are held at a standstill at their positions after movement until a predetermined time elapses.

As a result, the molded rear holders 32 and 33 are pressed against the housing 31, and are tentatively retained onto the housing 31 reliably without coming off.

Namely, as the rear holders 32 and 33 are pressed against the housing 31 by the overstroke movement of the third movable molds 14, the tentatively retaining projections 35 of the housing 31 are fitted in the retaining holes 32a and 33a, and the retaining pows 32b and 33b are fitted to the retaining means 36. Then, since the rear holders 32 and 33 are held pressed against the housing 31 by the third movable molds 14 until the predetermined time elapses, the rear holders 32 and 33 are tentatively retained onto the housing 31 reliably.

As described above, in accordance with the molding and tentatively retaining mold and the method of molding and tentative retention in this embodiment, at the time when the rear holders 32 and 33 after molding are moved toward the housing 31 and are tentatively retained, the amount of movement of the third movable molds 14 is set to be greater by a predetermined amount than the amount of movement necessary for tentative retention of the rear holders 32 and 33. Further, the third movable molds 14 after movement are stopped at the moved positions until a predetermined time elapses.

Accordingly, the rear holders 32 and 33 after molding are tentatively retained onto the housing 31 reliably, so that it is possible to reliably prevent such as the dislocation of the rear holders 32 and 33 from the housing 31 due to the softness and the like of the rear holders 32 and 33 immediately after molding in conjunction with the returning operation of the third movable molds 14.

As described above, in accordance with the molding and tentatively retaining mold of the invention, the amount of movement of a movable mold at the time when at least one part is relatively moved with respect to another part and is tentatively retained after molding is set to be greater by a predetermined amount than the amount of movement necessary for moving the one part. In addition, the movable mold after movement is stopped at the moved position until a predetermined time elapses.

Accordingly, the at least one part moved by the movable mold after molding is tentatively retained onto another part reliably without coming off, so that it is possible to prevent the trouble of such as the cancellation of the tentative retention of the parts.

In addition, in accordance with the method of molding and tentative retention of the invention, the amount of movement of a movable mold at the time when at least one part is relatively moved by the movable mold with respect to another part and is tentatively retained after molding is set to be greater by a predetermined amount than the amount of movement necessary for moving the one part. In addition, the movable mold after movement is stopped at the moved position until a predetermined time elapses.

Accordingly, the at least one part moved by the movable mold after molding is tentatively retained onto another part reliably without coming off, so that it is possible to prevent the trouble of such as the cancellation of the tentative retention of the parts.

What is claimed is:

1. A method of molding and tentatively retaining, comprising the steps of:

forming a plurality of cavities between a fixed mold and a plurality of movable molds provided in such a manner as to be relatively movable with respect to said fixed mold;

charging a molding material into said cavities through runners respectively provided for said cavities;

molding a plurality of kinds of independent parts of different shapes in said cavities;

moving relatively said at least one movable mold with respect to said another movable mold by a predetermined amount greater than an amount of movement necessary for tentatively retaining at least one of said parts to said other part, and stopping said movable mold at a moved position until a predetermined time elapses, wherein said moving by said predetermined amount is in the same direction as said movement necessary for tentatively retaining at least one of said parts to said other part.

2. A method of molding and tentatively retaining, according to the claim 1, wherein said predetermined amount of movement is set in such a manner that said at least one part is pressed against another part.

3. A method of molding and tentatively retaining, according to the claim 1, wherein said predetermined time is set in such a manner that resiliency of said parts becomes stabilized.

* * * * *